(12) United States Patent
Haj-Yousef

(10) Patent No.: US 6,192,622 B1
(45) Date of Patent: Feb. 27, 2001

(54) MOBILE DEVICE TO ERADICATE RED PALM WEEVILS AND TREES STEM BORERS

(76) Inventor: Yosri Moh'd Taher Haj-Yousef, Emirates Intellectual Property Services, P.O. Box 24320, Sharjah (AE)

(*) Notice: Subject to any disclaimer, the term of this patent is extended or adjusted under 35 U.S.C. 154(b) by 0 days.

(21) Appl. No.: 09/394,971

(22) Filed: Sep. 13, 1999

(30) Foreign Application Priority Data

Sep. 15, 1998 (JO) ....................................................... 214/98

(51) Int. Cl.⁷ ............................. A01M 1/20; A01M 1/22
(52) U.S. Cl. .................. 43/132.1; 43/112; 47/1.3
(58) Field of Search .................. 43/98, 112; 47/1.3, 47/124, 132.1; 361/232

(56) References Cited

U.S. PATENT DOCUMENTS

| | | | |
|---|---|---|---|
| 2,007,879 | * 7/1935 | Sefton | 47/1.3 |
| 4,092,800 | * 6/1978 | Wayland, Jr. et al. | 47/1.3 |
| 4,251,950 | * 2/1981 | Farque et al. | 47/1.3 |
| 5,060,414 | * 10/1991 | Wayland | 47/1.3 |
| 5,435,096 | * 7/1995 | Nekomoto | 43/112 |
| 5,442,876 | * 8/1995 | Pedersen | 43/124 |
| 5,468,938 | * 11/1995 | Roy | 43/112 |
| 5,575,106 | * 11/1996 | Martin et al. | 43/132.1 |
| 5,968,401 | * 10/1999 | Roy | 43/112 |

FOREIGN PATENT DOCUMENTS

| | | |
|---|---|---|
| 3804052 | * 8/1989 | (DE) . |
| 2684270 | * 6/1993 | (FR) . |
| 6-237677 | * 8/1994 | (JP) . |
| 10-295249 | * 11/1998 | (JP) . |
| WO 96/131157 | * 5/1996 | (WO) . |

* cited by examiner

*Primary Examiner*—Darren W. Ark
(74) *Attorney, Agent, or Firm*—Christensen O'Connor Johnson Kindness PLLC

(57) ABSTRACT

A high frequency power source (4) and (5) supplies electromagnetic waves (10–100 MHz) that are supplied to a single or a pair of plates (10) that surround a trunk of the infested tree. The electromagnetic waves are used to kill red palm weevils and trees stem borers within the trunk of the tree. The plates are cylindrical, half cylindrical or flat, with insulated metal sheets that surround the trunk and upper roots of the infected tree.

8 Claims, 2 Drawing Sheets

MOBILE DEVICE TO ERADICATE RED PALM WEEVILS AND TREES STEM BORERS

BACKGROUND OF THE INVENTION

Stem borers and red palm weevils are classified as economic pests because of their role in destroying the national economy of the afflicted countries. As an example, red palm weevils are considered to be the most serious blight, which threatens million of palm trees as well as coconut and ornamental palms in the gulf region and the whole world. At stake is the multi-million dollar date industry and the survival of historical icons.

Infestation was first discovered in the UAE in 1985, it was located in one of the farms. Soon after that, it spread to ten other firms. Nowadays, thousands of farms are estimated to have been infested by this weevil in the gulf and Arabian peninsula.

Such an exponential infection rate could, theoretically, blight the last remaining healthy palms in just a few years time. Red palm weevils are by no means limited to Arabia; they have already spread widely across Pakistan, India, Philippine, Iran and many other countries.

The seriousness of this problem attracted worldwide attention. Researches have been established and projects have been launched around the world to confront this winged plague. Arab governments as well as Arab Organization for Agricultural Development (AOAD), Islamic Development Bank (IDB) and International Fund for Agricultural Development (IFAD) fund-related projects and researches in the Arab countries.

The difficulty in controlling palm weevils is that they bore deep inside the palm trunk which made it hard for the insects to be got at with chemicals. Besides, early detection of infestation is difficult and treatment even in early stages may be too late to save the tree.

The symptoms of infestation vary, but commonly involve the followings: yellowness and wilt of palm leaves; fissures and burrows at the lower part of the trunk; affected palm attracts insects such as ants; beetles and worms, which feed on weevil's excreta, mixed with palm extraction. (A dark red stinky liquid found on the infested palm's stem).

Palm weevil is most active in a temperate weather and cold nights, during which weevils deposits their eggs into the fissures of a newly trimmed palms or around new shoots or inside the burrows made by other insects such as rhinoceros beetles.

Weevil's eggs are contained in a protective case or ootheca, which makes them immnune to the harmful effect of insecticides.

Later, eggs hatch into larvae known as grubs (grown grub is about 6 cm). The grub stage is the most destructive to the palm, since grubs feed entirely on palm tissue (trunk kernel). Grubs burrow inside the trunk, producing tunnels and fissures. As a result, palm extraction flows. Some of it feeds the grubs, the rest flows outside as a yellow clingy liquid, which turns after awhile into dark red. So, finding such substance on the palm stem is the first sign of infestation. Sometimes it is hard to observe the liquid, especially when the trunk is covered with shoots and dried fibers.

If not treated, grubs continue burrowing into the trunk, which spreads infestation. At the same time, the first infested site at the palm trnk still attracts insect females to deposit their eggs into it. So, at one instance of time, we find different phases of the insect in the same palm.

Grub reproduction can go on and on until a big hollow is made inside the trunk, causing it eventually to collapse and fall down, after which weevils, as all parasites do, start searching for another victim. According to some experts, each infected tree produces enough weevils to infect at least seven healthy new trees a year.

That briefly explains the seriousness and difficulty of controlling such a pest, which many experts like to call it palm AIDS or cancer.

Up until now, pest control is focused on traditional methods such as insecticides, pheromone traps, biological control, whereby special species of anti-insect worms are injected into the trunk of infected palm trees, etc. Despite all the efforts used, traditional methods proved to be not effective enough to eradicate the pests and prevent them from spreading to health plantations. Besides, they are associated with many side effects to humans and the environment.

Treating infested palm with this machine for just a few minutes will guarantee killing all weevils found on the palm in any of their phases.

SUMMARY OF THE INVENTION

It is well known since a very long time that high frequency electromagnetic waves, when directed on various subjects yield a variable amount of thermal energy directly determined by the substances of these subjects and the frequency of the magnetic waves. Some substances are highly affected by the waves. They heat up more and faster than others. Substances not vulnerable to those waves pass them through. This is the basic principle on which the molecular electromagnet resonance device is based. Exposing pests within palm trees stem to high frequency, high energy and highly selective electromagnetic waves (from 10 to 100 MHz frequency is backward proportional with selectivity, increasing frequency decreases selectivity and substances become with almost equal capabilities of absorbing energy) will lead to selective fast increase in pests temperature, without affecting the stem. Increasing pests temperature to around 60 degrees for duration of minutes results in their death. Luckily, palm trees stem bears higher temperatures, and it is well known that dates require high temperatures to ripen. In addition, frequency selectivity palm trees stem substances and precaution procedures such as stopping irrigation for some days will enable us to expose stems to electromagnetic waves for longer time without worrying about the tree.

DETAILED DESCRIPTION OF THE PREFERRED EMBODIMENT

Device Structure

Figure 1:
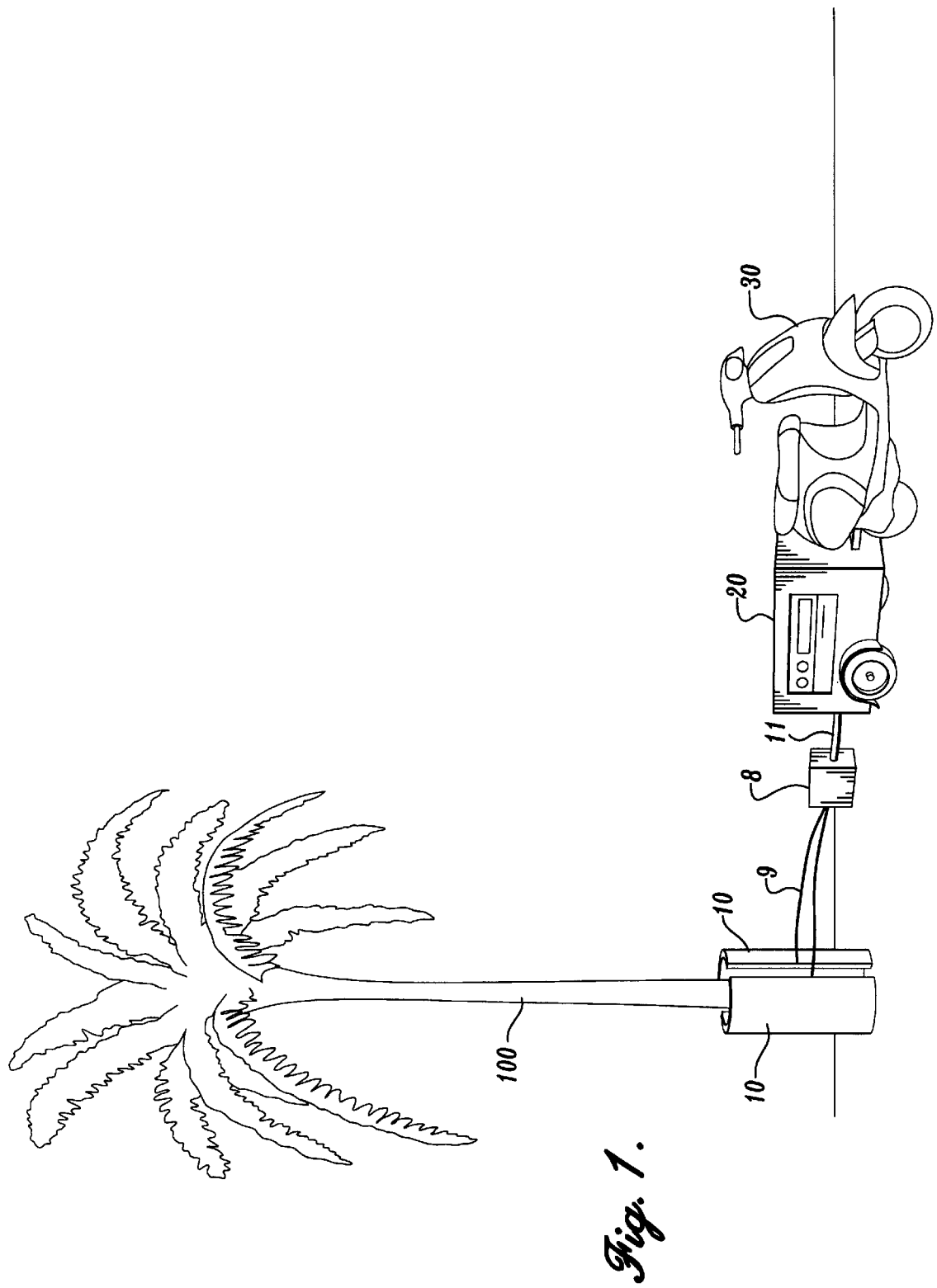
FIG. 1 shows the practical implementation of the idea.

The Device 20 contains a source of high frequency and high energy electromagnetic waves (10–100 MFz, 5–15 kW). This electromagnetic energy is passed to two plates 10 with half cylindrical shape (see FIG. 3) that surround the infected palm tree stem 100 (see FIG. 1). Device output power and exposure duration are adjusted in accordance with the stem diagonal, soil humidity and plates area. For longer stem diagonals, bigger plate area or high soil humidity, the device output power should be increased in order to destroy pests and achieve best results. The device 20 can be mounted on a Transport Car 30.

Figure 2:
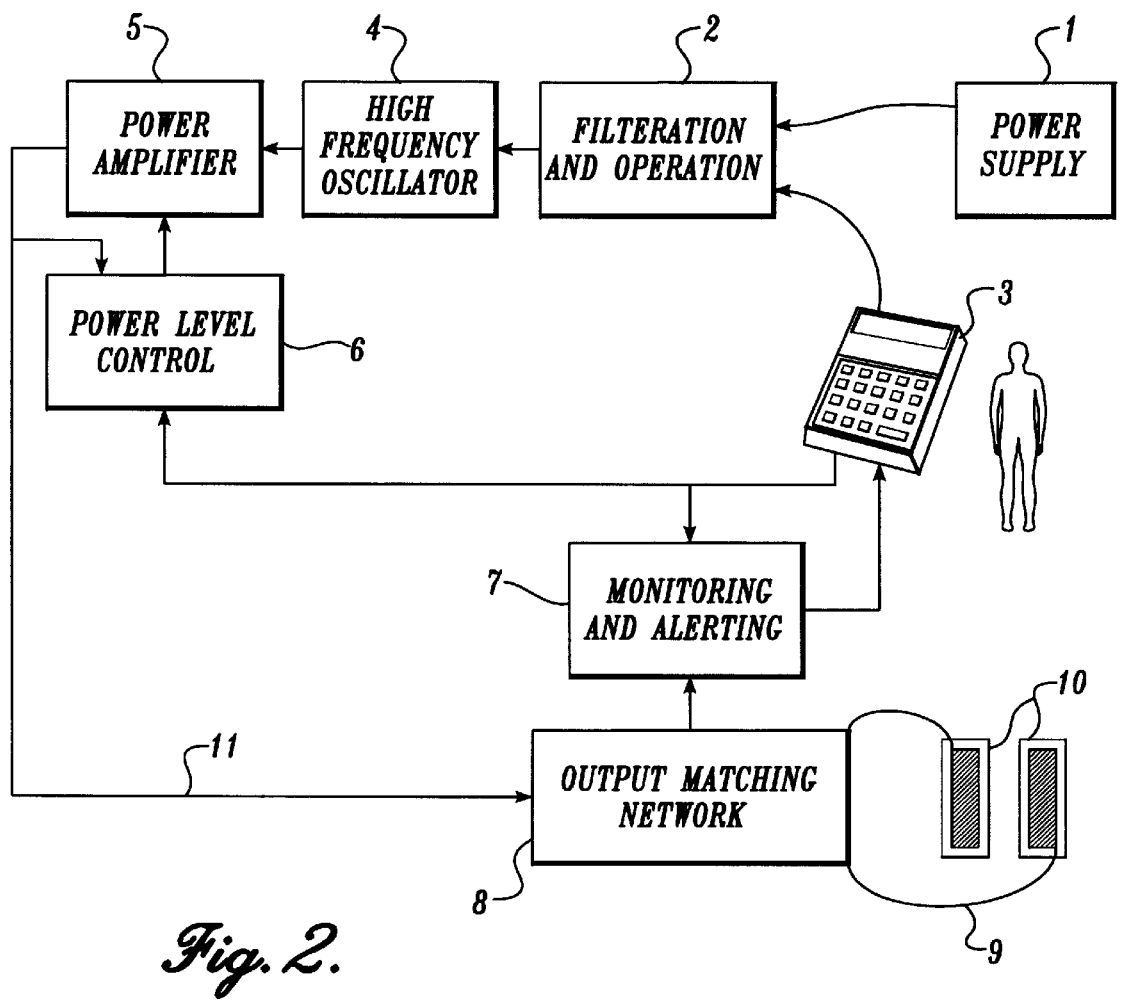
FIG. 2 illustrates the electronic components that comprise the present invention.

FIG. 2 shows various building blocks of the device.

Building Blocks Description

1. Power supply source: main power source, which provides the required power for the device. For plantations or farms, it could be implemented through mobile AC or DC power generator.

2. Filtration and operation unit: through which device startup is achieved. It contains the means to isolate waves generated in the device, in order to prevent their reflection and interference with power supply source.

3. Control panel: through which various parameters are adjusted by the operator, such as exposure time, energy and delay time required to keep the operator within limits of safe distance (several meters). When exposure process starts and ends, proper sound alarming is used.

4. High frequency oscillator: high frequency/low power generating circuits (10–100 MHz/parts of watt). Generated frequencies are determined by pest selectivity and allowed by government frequencies. Universally allowed frequencies for scientific, industrial and medical uses are: 13.56, 27.12, 40.68 MHz. Practically, I found that 40.68 MHz frequency is the most effective and have the best selectivity.

5. Power amplifier: waves at the output of the frequency generator are characterized with law energy. This building block amplifies the frequency power up to 5–15 kW.

6. Power level control unit: this block guarantees the frequency power stability, which may be affected by several factors such as in stability in source power or device units heat-up.

7. Monitoring and alerting unit: it continuously monitors the generated waves and compares them with required. In case of difference, the unit alarms and automatically stops the device (for more safety).

8. Output matching networks: it provides the compatibility between the output impedance of the power amplifier and the load impedance (palm tree stem). It's based on the open wires balanced type matching networks. The device load (palm tree stem) is characterized with complicated combination of pests capacitance, inductance and resistance, and the output matching network unit is positioned near the stem and connected to the power amplifier through a proper long coaxial cable 11.

9. Contact wires: metal conductors for transmission of electromagnetic high frequency waves. Characterized with high conductivity and covered with high quality isolation material. They are lengthy enough to connect output matching network unit to stem surrounding plates.

Figure 4:
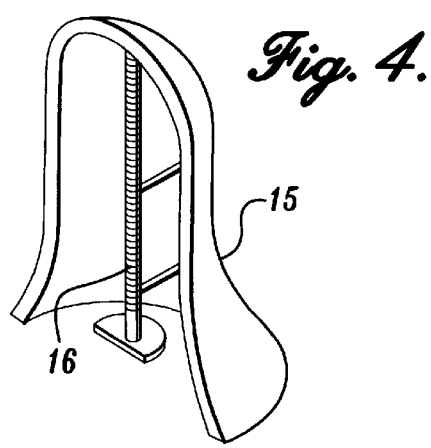
FIGS. 3 and 4 illustrate plates that surround a palm stem.
Figure 3:
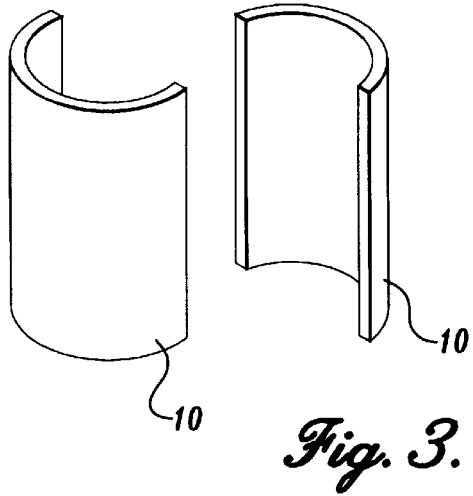

10. Stem surrounding plates: two replicated half-cylindrical or flat well electrically isolated surfaces metal plates to surround the stem and upper roots of the infected palm tree (FIG. 3). An improved plate design 15 (FIG. 4) closes the upper area of the plates and reflects dissipated waves. It also provides good exposure of upper roots area through a widened round base. It covers one or more metal rod 16 (grill type) electrically isolated from the reflector; that serve as an aerial for transmitting required waves which will be concentrated and reflected by the plates toward the stem and visible root for best effect.

The design of surrounding plates can be made by one flexible insulated metal sheet, covering the full circumference of the stem, similar to the way that the cuff of a blood pressure tester covers a patient's arm. This gives a better way of covering the stem, leading to the uniform distribution of energy at the infected area and minimizng the dissipated energy by using the tree roots as an ideal virtual discharge ground electrode. As known, the direction of the electromagnetic displacement current flows to the low potential zone (ground). This will oblige the use of a different type output matching network called "unbalanced" type. This way of improvement extends coverage area to reach deeper into the roots at the time of the treatment process.

Using electromagnetic high frequency waves to fight against destructive pests hiding inside tree stems using a mobile device is a new sure idea in such battle, which distinguishes it self from chemical insecticides and other materials 5 which may affect human life.

The embodiments of the invention in which an exclusive property or privilege is claimed are defined as follows:

1. A mobile system for killing red palm weevils and other tree stem borers in tree trunks without killing the trees, comprising:
   a source of electromagnetic wave energy;
   one or more insulated plates that are positionable adjacent a tree trunk;
   a controller that adjusts the source of the electromagnetic wave energy; and
   a matching network to match the complex load impedance of the tree trunk and an output impedance of the system.

2. The system of claim 1, wherein the source of electromagnetic wave energy comprises:
   a low power, high frequency oscillator that generates electromagnetic waves of 10 to 100 MHz.

3. The system of claim 2, further comprising:
   wherein the controller includes a power amplifier that receives the low power electromagnetic waves and increases their power to a level between 5 and 15 KWatts.

4. The system of claim 1, wherein the one or more insulated plates comprise a pair of half-cylindrical metal plates.

5. The system of claim 1, wherein each of the insulated plates comprises a semi-bell shaped cone surrounding one or more isolated metal rods that are coupled to receive the electromagnetic wave energy, the cone is capable of both covering a root of the tree and reflecting the electromagnetic wave energy delivered to the one or more isolated metal rods towards the tree trunk and root.

6. A method of killing red palm weevils and other tree stem borers within tree trunks and upper roots without killing the trees, comprising:
   surrounding a portion of a tree trunk with one or more insulated plates or sheets; and
   applying a high power, high frequency electromagnetic energy to the surrounding insulated plates or sheets to kill the red palm weevils and other tree stem borers within the tree trunk, stem and upper roots.

7. The method of claim 6, further comprising:
   selecting a frequency of the electromagnetic energy from the allowed fixed industrial standard in the ranges from 10 to 100 MHz.

8. The method of claim 6, further comprising:
   adjusting the power of the electromagnetic wave energy from 5 to 15 KWatts.

* * * * *